3,544,498
DETERGENT RESISTANT SILICONE POLISH

Norman G. Holdstock and Raymond J. Thimineur, Scotia, N.Y., assignors to General Electric Company, a corporation of New York
No Drawing. Filed July 17, 1968, Ser. No. 745,346
Int. Cl. C08g *31/24;* C09g *1/04, 1/12*
U.S. Cl. 260—29.2                                    18 Claims

ABSTRACT OF THE DISCLOSURE

An organopolysiloxane copolymer is prepared by the partial hydrolysis and condensation of a silanol-stopped polydimethylsiloxane having 5 siloxy units, an aminoalkyltrialkoxysilane, and an aminoalkoxyalkyltrialkoxysilane. A second organopolysiloxane copolymer is prepared by the partial hydrolysis and condensation of a silanol-stopped polydimethylsiloxane having 800 dimethylsiloxy units with an aminoalkoxyalkenyltrialkoxysilane. The first organopolysiloxane copolymer is converted to a partial amine salt by reaction with an aliphatic carboxylic acid, then mixed with the second organopolysiloxane. The resulting combination is used in detergent resistant polish formulations of improved rub-out and gloss.

---

This invention relates to a new class of combined organopolysiloxane copolymers, to partial amine salts thereof, and to the use of such partial amine salts in polish compositions of improved detergent resistancy, improved rub-out and improved gloss.

The use of organopolysiloxanes with or without waxes in polish compositions for the protection and appearance enhancement of various painted surfaces is well known in the art. The organopolysiloxanes have been used in such compositions because of improved rub-out. Improved rub-out is an increased ease with which the polish composition can be spread upon the surface to be treated and rubbed to a nonstreaked, uniform surface.

While silicones have gained very wide acceptance in this application, it has been generally recognized that these compositions were not as permanent as finish as desired, since the detergents commonly employed in washing polished surfaces tend to remove the polishing composition. In order to solve this problem, attempts have been made to add so-called detergent resistant silicones of various types to such compositions. While this has led to compositions of improved detergent resistancy, the resulting compositions were difficult to rub out and exhibited a relatively inferior gloss, as compared with the more conventional silicone-containing polish compositions.

The present invention is based on our discovery of a new combination of organopolysiloxane copolymers and the partial carboxylic salt thereof which is useful in polish compositions to provide the improved rub-out and gloss normally associated with conventional organopolysiloxane-containing polish and wax formulation, but which, in addition, exhibits improved detergent resistance.

The combination of organopolysiloxane copolymers of the present invention comprise:

(A) The parital hydrolysis and condensation product of
(1) a liquid silanol chain-stopped polydiorganosiloxane having the formula:

(1)
$$HO\left[\begin{array}{c}R\\|\\SiO\\|\\R\end{array}\right]_n H$$

(2) an aminoalkylsilane having the formula:

(2) 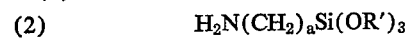

and (3) an aminoalkoxyalkylsilane or an aminoalkoxyalkenylsilane having the formula:

(3) 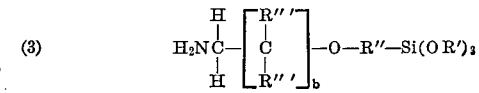

in combination with (B) The partial hydrolysis and condensation product of
(4) a fluid, silanol chain-stopped polydiorganosiloxane having the formula:

(4)
$$HO\left[\begin{array}{c}R\\|\\SiO\\|\\R\end{array}\right]_{n'} H$$

and (5) an aminoalkoxyalkylsilane or an aminoalkoxyalkenylsilane of the formula:

(5) 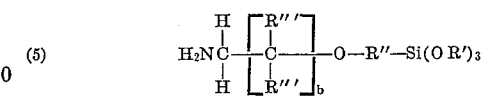

In the above formulas as in the ones that follow, R represents monovalent hydrocarbon radicals free of aliphatic unsaturation, at least 90% of which are methyl radicals, R' is an alkyl radical having up to 4 carbon atoms, R" is a divalent alkylene radical containing from 2 to 6 carbon atoms or a divalent alkenyl radical containing from 3 to 8 carbon atoms and an olefinic bond on the carbon atoms adjacent to the silicon atom, R''' is a radical selected from the class consisting of hydrogen, lower alkyl radicals having 1 to 8 carbon atoms, and 5 to 7 carbon cycloalkyl radicals, $n$ has a value of from about 2 to 20, inclusive, $n'$ has a value of from about 300 to 1000, inclusive, $a$ is an integer equal to from 3 to 6, inclusive, and $b$ is an integer equal to from 2 to 5, inclusive, said copolymer defined in paragraph A having a viscosity of from about 5 to 1000 centistokes at 25° C. and containing from about 1 to 15 percent by weight —OR' radicals based on the weight of said copolymer, the proportions of said polydiorganosiloxane, said aminoalkylsilane, and said aminoalkoxyalkylsilane or said aminoalkoxyalkenylsilane being selected to provide a total of from about 0.04 to 1.0 siloxane units derived from said aminoalkylsilane and said aminoalkoxyalkylsilane or said aminoalkoxyalkenylsilane per siloxane unit derived from said polydiorganosiloxane and from about 0.25 to 9 siloxane units derived from said aminoalkylsilane per siloxane unit derived from said aminoalkoxyalkylsilane.

The partial aliphatic carboxylic acid salts of the present invention are salts of said organosiloxane copolymer and an aliphatic carboxylic acid in which from about 10 to 50 percent of the amine groups of the aminoalkyl radicals of the said aminoalkylsilane and said aminoalkoxyalkylsilane are converted to amine salts.

The polish compositions of the present invention of improved rub-out, improved gloss and improved detergent resistance are emulsions comprising water, a partial aliphatic carboxylic acid salt of said organopolysiloxane copolymer described in paragraph A, the organopolysiloxane copolymer described in paragraph B, a hydrocarbon solvent, and an emulsifying agent, said copolymer solution defined in paragraph B having a viscosity of from about 10 to 15,000 centistokes, preferably 100 to 2,000 centistokes at 25° C. and containing from about 0.1 to 1.5 percent by weight —OR' radicals based on the weight of said copolymer, the proportions of said polydiorganosiloxane and said aminoalkoxyalkylsilane or said aminoalkoxyalkyenylsilane, as defined in paragraph B, being selected to provide a total of from about 0.002 to 0.013 siloxane units derived from said aminoalkoxyalkylsilane or said aminoalkoxyalkenylsilane per siloxane unit derived from said polydiorganosiloxane, said copolymer solution containing from 5 to 95% by weight based upon the total weight, of the copolymer solution defined in paragraph B.

The combination of organopolysiloxane copolymers of the present invention are unique compositions and exhibit properties which could not have been predicted from the nature of the components therein. Thus, if the polish composition is prepared only from the polydiorganosiloxane described in paragraph A, the resulting polish composition is very deficient in rub-out and gloss. When an analogous composition is prepared from the polydiorganosiloxane described in paragraph B, the material is slow to cure and dust pickup becomes a problem. When the composition contains the polydiorganosiloxane described in paragraph A and the polydiorganosiloxane described in paragraph B but is added to a polish formulation without converting a portion of the amine groups to aliphatic carboxylic acid salts, the product does not form a stable emulsion. Thus, the compositions containing the polydiorganosiloxane described in paragraph A in combination with the polydiorganosiloxane described in paragraph B are unique compositions and, when combined with the aliphatic carboxylic acid, form additional unique compositions which are converted to unique polish compositions.

The organopolysiloxane copolymers which contain aminoalkoxyalkyl radicals free of chain branching described in paragraphs A and B are formed from known types of organosilicon materials and the method of forming such copolymers is relatively conventional, even though the proportions of components employed in the copolymers is relatively fixed and even though the degree of partial hydrolysis is relatively fixed in order to provide the compositions of the present invention.

On the other hand, the organopolysiloxane copolymers described in paragraphs A and B which contain aminoalkoxyalkyl radicals which contain chain branching on the alkoxy radical or which contain aminoalkoxyalkenyl radicals are new compositions of matter possessing unique and unexpected properties when incorporated into polish compositions. The methods employed for forming such copolymers will be set forth in detail.

The silanol chain-stopped polydiorganosiloxane of Formulas 1 and 4 are well known in the art, with various silanol chain-stopped polydimethylsiloxanes being readily available materials. In the preferred embodiment of our invention, the silanol fluid of Formula 1 is a silanol chain-stopped polydimethylsiloxane and, in the preferred embodiment of our invention, the material is relatively low molecular weight and contains an average of from about 4 to 7 dimethylsiloxane units per molecule, even though the compositions of the present invention broadly encompass compositions containing from 2 to about 20 diorganosiloxane units per molecule.

The silanol fluid of Formula 4 is a chain-stopped polydimethylsiloxane and, in the preferred embodiment of our invention, the material is relatively high molecular weight and contains an average of from about 600 to 1000 dimethylsiloxane units per molecule, even though the compositions of the present invention broadly encompass compositions containing from 300 to 1,000 diorganosiloxane units per molecule.

As mentioned earlier, at least about 90% of the R groups in the polydiorganosiloxane of Formulas 1 and 4 should be methyl radicals. Where the R groups are radicals other than methyl, it is preferred that the other radicals be selected from the class consisting of ethyl and phenyl. However, within the scope of the present invention are those polydiorganosiloxanes in which the silicon-bonded organic groups other than methyl include the broad class of organic hydrocarbon groups free of aliphatic unsaturation which are normally associated with silicones. Thus, other radicals represented by R include alkyl radicals such as propyl, butyl, octyl, octadecyl, etc., radicals; cycloalkyl radicals, e.g., cycloheptyl, cyclohexyl, etc., radicals; monocyclic and polycyclic aryl radicals, e.g., phenyl, tolyl, xylyl, naphthyl, etc., radicals; aralkyl radicals, particularly monocyclic lower aralkyl radicals, e.g., benzyl, phenylethyl, phenylpropyl, etc. radicals. These radicals other than methyl can be present in the polydiorganosiloxane in any of the conventional fashions as, for example, being attached to the same silicon atom to which a methyl radical is attached, or being attached to a silicon atom which is free of methyl radicals. Likewise, a given silicon atom can contain a mixture of radicals other than methyl. Thus, these other radicals than methyl can be present in the polydiorganosiloxane as methylethylsiloxane units, methylpropylsiloxane units, methylphenylsiloxane units, diphenylsiloxane units, phenylethylsiloxane units, etc.

The aminoalkoxyalkenyl silanes are new compositions of matter and are derived from cyanoalkoxyalkenylsilanes. The cyanoalkoxyalkenylsilanes are also new compositions of matter and fall within the scope of the formula:

(6)
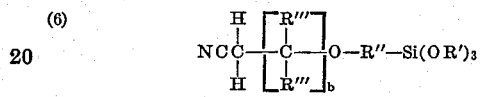

where R′, R″, R‴ and $b$ are as previously defined.

More specifically, in the above formulas as well as the formulas that follow, R′ is an alkyl radical having up to 4 carbon atoms, e.g., methyl, ethyl, propyl, isobutyl, etc. radicals, R″ is selected from the class consisting of a divalent alkylene radical containing from 2 to 6 carbon atoms and divalent alkenyl radicals containing from 3 to 8 carbon atoms and an olefinic bond on the carbon atom adjacent to the silicon atom, e.g., ethylene, propylene, isobutylene, hexylene, propenylene,

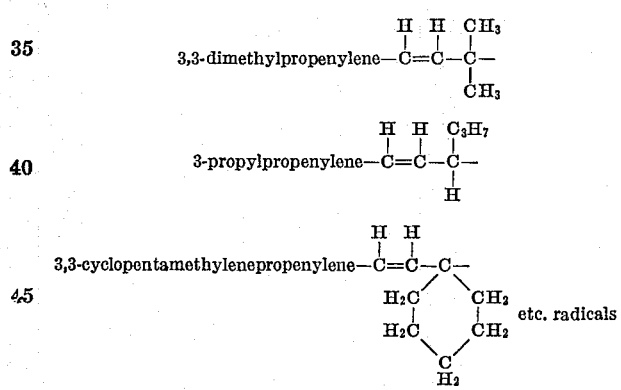

R‴ is a radical selected from the class consisting of hydrogen, lower alkyl radicals having one to 8 carbon atoms, e.g., methyl, ethyl, propyl, butyl, pentyl, heptyl, etc. radicals and cycloalkyl radicals having 5 to 7 carbon atoms in the ring, e.g., cyclopentyl, cyclohexyl, cycloheptyl, etc. radicals.

The aminoalkoxyalkenyl silanes of Formula 5 corresponding to the cyanoalkoxyalkenylsilanes of Formula 6 are prepared by the hydrogenation of the corresponding cyanoalkoxyalkenylsilanes. Aminoalkoxyalkenylsilanes within the scope of Formula 5 include, for example, compounds represented by the following formulas:

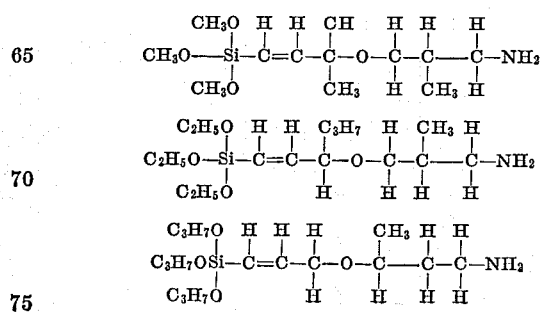

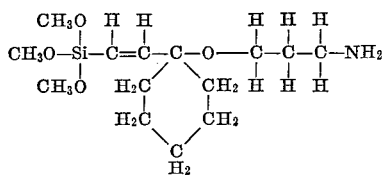

The aminoalkoxyalkenylsilanes within the scope of Formula 3 are monoaminoalkoxyalkenyltrialkoxysilanes as is apparent from Formula 3. These materials are new compositions of matter which possess valuable and unexpected properties when used in a polish composition, e.g., they cause the polish to cure on a surface at an accelerated rate and they improve the detergent resistance of the polish by as much as 2 to 3 fold.

The aminoalkoxyalkenylsilanes within the scope of Formula 3 are formed by reducing the corresponding cyanoalkoxyalkenylsilane with hydrogen in the presence of a hydrogenation catalyst, such as finely divided Raney nickel and isolating the product by fractional distillation.

The cyanoalkoxyalkenyl-substituted silanes in turn are formed by the reaction of a cyanoalkyl ether of an acetylenic alcohol with a trialkoxysilane in the presence of an appropriate catalyst for the addition of the silicon-hydrogen linkage of the trialkoxysilane across the unsaturated bond of the acetylenic ether. Any platinum compound catalyst useful for SiH-olefin addition reactions is an appropriate catalyst which may be used in this type of reaction.

Thus, 3-methyl - 3 - (cyanoethoxy) - 1 - trimethoxybutene-1 can be prepared by reacting beta-(3-dimethylpropargyloxy)-propionitrile with trimethoxysilane in the presence of a minor amount of chloroplatinic acid.

As briefly described earlier, the usual method for preparing an aminoalkoxyalkenylsilane within the scope of the present invention is by cyanoethylation type reaction. This involves reacting a cyanoalkyl ether of an acetylenic alcohol with a trialkoxysilane.

The cyanoalkyl ether of an acetylenic alcohol is made by reacting an acetylenic alcohol within the scope of the formula:

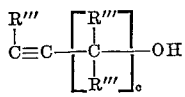

where $c$ has a value of one to 4 with a nitrile within the scope of the formula:

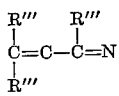

in the presence of a basic catalyst to produce an acetylenic nitrile within the scope of the formula:

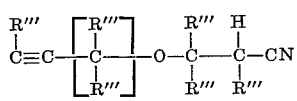

When a tertiary alkynol is reacted, the basic catalyst used in the reaction is preferably sodium methoxide. When a primary alkynol is reacted, a polystyrene supported quaternary base is the preferred catalyst. However, in either case, other strong base catalysts may also be used, such as other alkali metal alkoxides, alkali metal hydroxides, solubilized quaternary ammonium hydroxides, etc.

Examples of alkynols which can be employed in the above-described reaction include those of the following formulas:

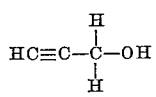
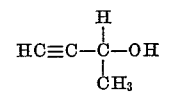
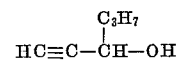
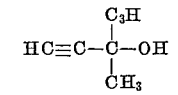
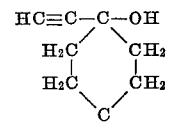
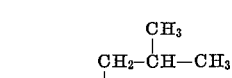
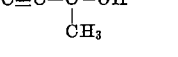
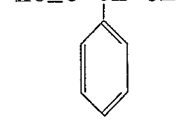
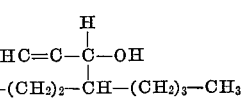
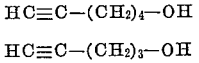
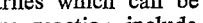

Examples of nitriles which can be employed in the cyanoethylation type reaction include those having the following formulas:

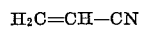
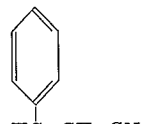
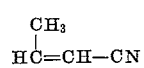
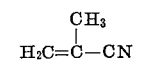

The aminoalkylsilanes of Formula 2 are aminoalkyltrialkoxysilanes which are well known in the art and their preparation is described, for example, in Pat. 2,930,809—Jex et al. These materials are generally formed by reduction of the corresponding cyanoalkyltrialkoxy silane by the use of hydrogen in the presence of a conventional hydrogenation catalyst, such as Raney nickel. As is apparent from the definition of R', the aminoalkyltrialkoxysilanes include those in which the alkyl radical ranges from methyl to butyl.

Illustrative of the specific aminoalkyltrialkoxysilanes within the scope of Formula 2 is the preferred silane which is gamma-aminopropyltrimethoxysilane, as well as other materials, such as gamma-aminopropyltriethoxysilane, omega-aminohexyltributoxysilane, etc. While the aminoalkylsilane has been described as a monoaminoalkyltrialkoxysilane in Formula 2 and in the preceding description, it should be understood that minor amounts of difunctional aminoalkylsilanes can also be present in the initial starting materials and in the final copolymers of the present invention. Such materials are prepared by the same process by which the gamma-aminopropyltrialkoxysilanes are prepared and, in particular, involves the reduction of a substituted cyanoalkyldialkoxysilane. For example, gamma-aminopropylmethyldimethoxysilane can be prepared from beta-cyanoethylmethyldimethoxysilane by hydrogenation of the nitrile radical to the corresponding amino group. Thus, it is within the scope of the present invention that up to about 10% by weight of the aminoalkyltrialkoxysilane of Formula 2 can be replaced by a difunctional silane which has the formula:

$$H_2N(CH_2)_aSi(R)(OR')_2$$

where R', R, and $a$ are as previously defined.

The aminoalkoxyalkylsilanes within the scope of Formula 3 are monoaminoalkoxyalkyltrialkoxysilanes, as is apparent from Formula 3. While these materials are relatively new in the art, reference to compounds within the generic Formula 3 containing unbranched aminoalkoxy radicals is found, for example, in V. M. Vdorin, R. Sultanov, T. A. Sladkova, L. KH. Freidlin, and A. A. Petrov, Izvest. Akad. Nauk. S.S.S.R., Otdel. Khim. Nauk. 1961, 2007–12 and U.S. Pat. 3,341,563—Buchheit 1957.

The aminoalkoxyalkylsilanes of Formula 3 are formed by reducing the corresponding cyanoalkoxyalkylsilane with hydrogen in the presence of a hydrogenation catalyst, such as finely divided Raney nickel and isolating the product by fractional distillation.

The cyanoalkoxyalkyl-substituted silanes in turn are formed by reaction of a cyanoalkyl ether of an unsaturated alcohol with a trialkoxysilane in the presence of an appropriate catalyst for the addition of the silicon-hydrogen linkage of the trialkoxysilane across the olefinic double bond of the unsaturated ether. Thus, cyanoethoxypropyltrimethoxysilane can be prepared by reacting the cyanoethyl ether of allyl alcohol with trimethoxysilane in the presence of a minor amount of chloroplatinic acid by means well known in the art. The cyanoalkoxyalkylsilanes which are free of chain branching on the cyanoalkoxy radical are known in the art, e.g., J. L. Speier, J. A. Webster and G. H. Barnes, J. Am. Chem. Soc. 79, 974 (1957).

Another illustration of the preparation of one of the cyanoalkoxyalkylsilanes is the reaction of triethoxysilane with the vinyl ether of ethylene cyanohydrin to produce cyanoethoxyethyltriethoxysilane, which can be reduced with hydrogen to the 2-(3-aminopropoxy)ethyltriethoxysilane. Similarly, 3 - (2 - cyanoethoxy)-2-methylpropyltrimethoxysilane is prepared by adding trimethoxysilane across the double bonds of the methallyl ether of ethylene cyanohydrin and is then reduced to 3-(3-aminopropoxy)-2-methylpropyltrimethoxysilane.

From the description of the preparation of the compositions of Formula 3, it is seen that the cyanopropoxy radical is attached to silicon through at least two carbon atoms. The cyanoalkoxyalkylsilanes which contain chain branching in the cyanoalkoxy radical are made by reacting a branched chain nitrile containing conjugated unsaturation, such as methacrylonitrile, with an unsaturated alcohol in the presence of a quaternary ammonium hydroxide type of anion exchange resin. The use of the quaternary ammonium hydroxide type of anion exchange resin in cyanoethylation type reactions is known in the art, e.g., M. J. Astle and R. W. Etherington, Ind. and Eng. Chem. 44, 2871 (1952).

Illustrative aminoalkoxyalkylsilanes within the scope of Formula 3 include the preferred material, which is 3-(2-methyl-3-aminopropoxy)propyltrimethoxysilane, as well as other materials, such as 3 - (3 - aminopropoxy)-2-methylpropyltrimethoxysilane, 3 - (2 - aminoethoxy)propyltripropoxysilane, 2 - (3 - aminopropoxy)ethyltrimethoxysilane, 3 - (6 - aminohexoxy)propyltributoxysilane, 6- (3 - aminopropoxy)hexyltrimethoxysilane, 3 - (3-aminopropoxy)propyltrimethoxysilane, 3 - (1-methyl-3-aminopropoxy) - 2 - methylpropyltrimethoxysilane, etc.

Illustrative aminoalkoxyalkenylsilanes within the scope of Formula 3 include the materials described in the discussion of Formula 5 and the aminoalkoxyalkylsilanes described in the discussion of Formula 3 are also included within the scope of Formula 5. However, the types of materials described in the discussion of each formula are the preferred materials.

While the aminoalkoxyalkylsilanes of Formula 3 have been described as monoaminoalkoxyalkyltrialkoxysilanes and monoaminoalkoxyalkenyltrialkoxysilanes, it should be understood that minor amounts of difunctional materials containing the same carbon functional group can also be employed in this invention. For example, the silane of Formula 3 can be modified by including therein minor amounts, e.g., up to 10% by weight of difunctional silanes having the formula:

(7) 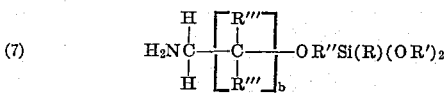

where R, R', R", R'" and $b$ are as previously defined. The preparation of the difunctional materials of the above Formula 7 is analogous to the processes employed in the preparation of the trifunctional aminoalkoxyalkylsilanes within the scope of Formula 3, except that the starting material contains a single silicon-bonded R group and only two silicon-bonded alkoxy groups. Illustrative of the difunctional compositions within the scope of Formula 7 are, for example, 3 - (2-methyl-3-aminopropoxy)propylmethyldimethoxysilane, 3 - (3 - aminopropoxy)propylmethyldimethoxysilane, 4 - (6-aminohexoxy)butylphenyldipropoxysilane, 3-(2 - methyl-3-aminopropoxy)propylethyldimethoxysilane, etc. The use of the difunctional silane of Formula 5 in minor amounts leads to the presence of siloxane units corresponding to the difunctional silane in the organopolysiloxane copolymer, which results from the hydrolysis and condensation reaction employed in preparing the copolymers of the present invention.

In preparing the organopolysiloxane copolymers described in paragraph A, the mixture of the silanol chain-terminated polydiorganosiloxane of Formula 1, the aminoalkylsilane of Formula 2, and the aminoalkoxyalkylsilane or aminoalkoxyalkenylsilane of Formula 3 are partially hydrolyzed and condensed by the mixing of the reactants and the addition of an amount of water necessary to result in the degree of hydrolysis and condensation desired. The amount of hydrolysis and condensation desired is that amount sufficient to result in a copolymer containing the desired viscosity and the desired alkoxy content. The reaction between the water and the other components of the hydrolysis and condensation mixture is first to hydrolyze the silicon-bonded alkoxy groups of the gamma-aminoalkylsilane of Formula 2 and the aminoalkoxyalkylsilane or aminoalkoxyalkenylsilane of Formula 3 and replace some of the alkoxy groups with hydroxyl groups. These hydroxyl groups then condense with each other to form new siloxane linkages, which results in an increase in viscosity of the reaction mixture and in the formation of the organopolysiloxane copolymer. The amount of water which is used in preparing the copolymers is, of course, within the skill of the art, but is less than one molecule of water per silicon-bonded alkoxy group in the silane of Formula 2 and Formula 3, since it is desired to keep in the reaction product from 1 to 15 percent by weight of alkoxy groups. After the partial hydrolysis and condensation of the mixture of the silanol-terminated polydiorganosiloxane of Formula 1, the silane of Formula 2 and the silane of Formula 3, the reaction mixture consists of the organopolysiloxane copolymer, free alcohol corresponding to the alkoxy group which is hydrolyzed from the silane by the water addition, and water resulting from the condensation of silanol groups. This water and alcohol can be left in the reaction mixture or can be readily stripped therefrom by stripping at reduced pressures at temperatures ranging from room temperature up to 20 to 40° C. In the preferred embodiment of our invention, the water and alcohol are not separated from the reaction products, since they have no adverse effect on the reaction products or on the salts and polish emulsions made therefrom.

While we do not wish to be bound by theory, we believe that the silanol chain-stopped polydiorganosiloxanes of Formula 1 and the silanes of Formula 2 react without any significant rearrangement and condensation of the initial reaction products so that the polydiorganosiloxane units present in the initial starting material of Formula 1 remain in a substantially unaffected block in the organopolysiloxane copolymer. Thus, if the silanol chain-terminated polydimethylsiloxane of Formula 1 was a material within the scope of Formula 1 when $n$ was equal to 5, the resulting copolymer would contain blocks of 5 diorganosiloxane units separated by siloxane units derived from the silane of formula 2 or the silane of Formula 3.

The proportions of the polydiorganosiloxane of Formula 1 and the silanes of Formula 2 and Formula 3 are selected so that the final product contains a total of from .04 to 1.0 siloxane units derived from the silane of Formula 2 and the silane of Formula 3 per siloxane unit derived from the polydiorganosiloxane of Formula 1. The relative proportions are also selected so that from 0.25 to 9 siloxane units are derived from the aminoalkylsilane of Formula 2 per siloxane unit derived from the aminoalkoxyalkylsilane of Formula 3.

The organopolysiloxane copolymer is converted to a partial aliphatic carboxylic acid salt by reacting the copolymer with an amount of aliphatic carboxylic acid sufficient to convert from 10 to 50 percent of the amine groups to amine salt groups. In general, the reaction between the amine groups of the copolymer is substantially stoichiometric and the amount of aliphatic carboxylic acid salt employed is sufficient to convert from 10 to 50 percent of the amine groups in the organopolysiloxane copolymer to carboxylic acid salt groups.

Among the aliphatic carboxylic acids which are useful in preparing the salts of the present invention are all of the conventional monobasic aliphatic carboxylic acids, both saturated and unsaturated. Useful aliphatic carboxylic acids include the saturated monobasic acids free of substituents other than carbon and hydrogen, aside from the carboxyl group, such as formic acid, acetic acid, n-butyric acid, caproic acid, lauric acid, stearic acid, etc. Among the aliphatically unsaturated acids containing only carbon and hydrogen outside of the carboxyl group are angelic acid, tiglic acid, crotonic acid, acrylic acid, undecylenic acid, oleic acid, linoleic acid, linolenic acid, etc.

While all of the foregoing acids are useful in forming the salts of the present invention, in the preferred embodiment of our invention, the acid is a lower molecular weight acid, such as acids containing up to about 8 carbon atoms. The preferred specific aliphatic carboxylic acid useful in the practice of the present invention is acetic acid.

In order to form the salt of the present invention, the aliphatic carboxylic acid is merely dissolved into the organopolysiloxane copolymer and the amine salt of the acid is immediately formed and is a stable product. On the other hand, as is described in more detail hereinafter, the organopolysiloxane copolymer can be converted to the acid salt at the same time as the organopolysiloxane copolymer is formed into a polish composition by the addition of the aliphatic carboxylic acid at the same time as the other components of the polish composition are added. The result is equivalent in both cases.

In preparing the organopolysiloxane copolymers described in paragraph B, the mixture of the silanol chain-terminated polydiorganosiloxane of Formula 4 and the aminoalkoxyalkylsilane or the aminoalkoxyalkenylsilane both of Formula 5 are condensed by the mixing of the two reactants 4 and 5. The amount of condensation desired is that amount sufficient to result in a copolymer containing the desired viscosity and the desired alkoxy content. The condensation reaction between the silanol chain-terminated polydiorganosiloxane of Formula 4 and the aminoalkoxyalkylsilane or the aminoalkoxyalkenylsilane both of Formula 5 is a condensation reaction resulting in the formation of a siloxane linkage between the residue of the silane of Formula 5 and the residue of the siloxane of Formula 4 with alcohol being split out. The alcohol preferably is allowed to remain in the reaction product to act as a hydrolysis and condensation inhibitor. The ratio of the reactants is chosen so as to prevent excessive cross-linking, which results in gelling of the copolymer. This is accomplished by adding two to five moles of the silane of Formula 5 for every mole of the siloxane of Formula 4. This results in a reaction product consisting of a polydiorganosiloxane residue derived from the siloxane of Formula 4 terminated with an aminoalkoxyalkyldialkoxysilane radical or an aminoalkoxyalkenyldialkoxysilane radical derived from a silane of Formula 5. By thus providing non-reactive terminal groups, further reaction resulting in cross-linking and gelling is prevented.

The polish emulsions of the present invention of improved rub-out, improved gloss and improved detergent resistance comprise the partial aliphatic carboxylic acid salts of the polysiloxane copolymer as described in paragraph A, the polysiloxane of paragraph B, one or more solvents, one or more emulsifying agents, and water as essential ingredients. In addition, these polish emulsions can also contain abrasives, waxes, thickeners, stabilizers, and conventional silicone fluids.

The solvents employed in the practice of the present invention are preferably aliphatic hydrocarbon solvents which act as partial solvents for the partial aliphatic carboxylic acid salts of the present invention and for any additional conventional silicone fluid employed in the composition. Suitable hydrocarbon solvents include coal tar naphtha, cyclohexane, gasoline, isoparaffins, naphtha, Stoddard's solvent, mineral spirits, etc.

The emulsifying agents employed in the practice of the present invention are those emulsifying agents suitable for effecting emulsification of the composition. Generally, the emulsifying agent can be cationic, anionic, or non-ionic, with the particular emulsifying agent or combination of emulsifying agents being adjusted by those skilled in the art to provide the desired emulsification characteristics. Suitable cationic emulsifiers include mono and diglycerides of edible fats and oils; sorbitan fatty acid esters, such as sorbitan monooleate, sorbitan monolaurate, sorbitan monopalmitates, sorbitan monostearate, sorbitan dioleate, sorbitan tristearate, sorbitan trioleate, etc.; polyoxyalkylene sorbitol fatty acid esters, such as polyoxyethylene sorbitan monolaurate, monopalmitate, monostearate, monooleate, trioleate, etc.; polyoxyalkylene sorbitol esters, such as polyoxyethylene sorbitol oleate, laurate, etc.; polyoxyethylene acids, such as polyoxyethylene stearates, polyoxyethylene palmitates, polyoxyethylene laurates, etc.; polyoxyalkylene ethers, e.g., polyoxyethylene lauryl ether, cetyl ether, stearyl ether, olelyl ether, tridecyl ether, etc.; polyoxyethylene fatty glycerides; polyoxyalkylene alkyl amines; N-cetyl-N-ethylmorpholinium ethosulfates; N - soya-N-ethylmorpholinium ethosulfates; alkylaryl sulfonates; quaternary amine acetates; polyoxyethylene nonyl phenols; sodium dioctylsulfosuccinates; morpholine oleate; triethanolamine stearic acid salts; etc. In some cases, where the emulsifying agent is a salt, such as a salt of an amine, the amine and the acid portion of the amine salt are added separately to the reaction mixture or are added as separate components of the reaction mixture and the amine salt emulsifier is formed in situ. Thus, where the emulsifier is a material such as morpholine oleate, the oleic acid is added separately from the morpholine to produce the emulsifying agent.

Where a wax is employed in the composition of the present invention, any of the conventional waxes employed in polishing compositions are satisfactory. Included among these waxes are paraffins, micro-crystalline waxes, oxidized micro-crystalline waxes, polyolefins, such as polyethylene, and oxidized polyolefins, such as oxidized polyethylene, carnauba wax, bees wax, hydrogenated caster oil, etc.

The abrasives which can be employed in the compositions of the present invention are those conventional abrasives employed in polish compositions, with the most common of such being diatomaceous earth, aluminum silicate, and aluminum oxide, such as hydrated alumina.

The preferred abrasive is a mixture of 15% amorphous silica having a 15 micron particle diameter, 35% aluminum silicate having a particle diameter of 3 to 10 microns and 50% of Kaolin clay. The use of this mixture gives a gloss, emulsion stability and detergent resistancy to the polish which is superior to any of the other abrasives.

Where abrasives are employed in the compositions of the present invention, it is also desirable to employ thickeners or stabilizers or suspending agents which serve to suspend the abrasive in a stable structure and prevent settling and compacting upon storage. In cases where abrasives are not employed, it is sometimes also desirable to add thickeners or stabilizers to change the consistency of the polish formulation or to insure that any insoluble materials in the polish remain in suspension. Suitable thickneres include natural gums, such as gumarabic or gum tragacanth, carboxymethyl cellulose, polyvinyl alcohol, various alginates, carboxyvinyl polymers, such as those sold under the trade name Carbopol, as well as inorganic suspending agents, such as the complex colloidal magnesium aluminum silicate sold under the tradename Veegum. Where one of the carboxyvinyl suspending agents is employed, there is also employed a sufficient amount of a neutralizing agent, such as triethanolamine, to neutralize the acid in the suspending agent.

Where silicones are employed as additives in the compositions of the present invention, the silicones employed are the conventional methyl silicone fluids common to polish technology. The preferred materials are trimethylsilyl chain-stopped polydimethylsiloxanes having viscosities of from about 50 to 100,000 centistokes at 25° C. are are described in Pat. 2,469,888—Patnode, as well as in many other places in the polish art. Some of the methyl radicals of the methyl silicone fluids can be replaced with ethyl or phenyl radicals to provide in many instances equally good results.

While the proportions of the various components of the present invention can vary within extremely wide limits, the preferred proportions are those set forth in the following table.

TABLE I

| Component: | Weight percent |
|---|---|
| Partial salt of polysiloxane of paragraph A. | 0.1–4.0 |
| Polysiloxane of paragraph B | 0.1–3.0 |
| Solvent | 10–60 |
| Emulsifying agents | 0.5–5.0 |
| Water | 20–85 |
| Wax | 0–7.5 |
| Abrasive | 0–15 |
| Thickeners | 0–2 |
| Silicone fluid | 0–6.0 |

The water in oil emulsions of the present invention are prepared by mixing all of the components of the reaction mixture except water and any abrasive which is to be present in the final product. This mixture is effected in any convenient manner and is designed to accomplish a reasonably good dispersion of all of the components. During this mixing operation, the organopolysiloxane copolymer and the aliphatic carboxylic acid can be added separately or as a preformed partial aliphatic carboxylic acid salt of the copolymer. Once these compositions are mixed, the required amount of water is added and the resulting mixture is agitated under high shear to form the emulsion. Once the emulsion has been formed, any desired abrasive is added under relatively low shear mixing conditions, since satisfactory dispersion of the abrasive is readily obtained and high shear will merely tend to accelerate the wearing of the mixing apparatus.

The procedure employed for forming oil in water polish emulsions will depend upon the materials used to formulate the polish. The formulation of oil in water polish emulsions is well known in the polish art. Care must be taken, however, to neutralize any appreciable quantity of acidic materials before they come into contact with the amine functional silicones of the present invention.

The following examples are illustrative of the practice of our invention and are not intended for limitation. All parts are by weight.

EXAMPLE 1

Water in oil liquid automobile polish

The compound 3-(3-aminopropoxy)propyltrimethoxysilane was prepared by placing in a reaction vessel which had been pressurized to about 55 p.s.i. with hydrogen, 150 parts of 3 - (2-cyanoethoxy)propyltrimethoxysilane, 12 parts of finely divided Raney nickel catalyst and 0.5 part sodium methoxide. The reaction mixture was then heated to a temperature of 100 to 120° C. and the pressure of hydrogen gas was maintained at about 55 p.s.i. After hydrogen absorption ceased after 3 hours, pressure on the system was released and the liquid product was decanted from solids and fractionally distilled to produce 128 parts of 3-(3-aminopropoxy)propyltrimethoxysilane having a boiling point of 140° C. at 5 mm. Hg.

To a reaction vessel was added 60 parts of a silanol chain-stopped polydimethylsiloxane within the scope of Formula 1 in which $n$ was equal to about 5, 15 parts of 3-(3-aminopropoxy)propyltrimethoxysilane, and 25 parts of gamma-aminopropyltrimethoxysilane. This reaction mixture was thoroughly mixed and then 0.7 part water was added with stirring. This resulted in an organopolysiloxane copolymer having a viscosity of about 150 centistokes containing about 4.5 percent by weight methoxy groups and in which 79.3 mole percent of the siloxane units were derived from the silanol chain-stopped polydimethylsiloxane, 6.4 mole percent of the siloxane units were derived from 3-(3-aminopropoxy)propyltrimethoxysilane, and 14.3 mole percent of the siloxane units were derived from gamma-aminopropyltrimethoxysilane.

Seven parts of the copolymer was converted to the partial aliphatic carboxylic acid salt by reaction with 0.35 part acetic acid to produce a product in which 37 mole percent of the amine groups were converted to the amine salt of acetic acid.

A second polysiloxane copolymer was formed by adding to a reaction vessel 97.5 parts of a silanol chain-stopped polydimethylsiloxane containing 800 dimethylsiloxy units, 2.5 parts of 3-(3-aminopropoxy)propyltrimethoxysilane and 33 parts of a mixture of isoparaffins having an average boiling point of 190° C. The silane reacted with the siloxane without the addition of heat. The solution of product formed had a viscosity of 1400 centistokes at 25° C. and the solution was slightly hazy.

The partial acetic acid salt and the second polysiloxane copolymer were incorporated into a polish emulsion by forming a mixture of 1.5 parts of the partial acid salt, 4.0 parts of the second polysiloxane copolymer solution and one part of a trimethylsilyl-stopped dimethyl silicone oil containing 200 dimethylsiloxy units, 2 parts of a sorbitan monooleate emulsifier, 0.2 part of a polyoxyethylene sorbitan monooleate emulsifier, 20.0 parts of isoparaffins having an average boiling point of 190° C. and 15 parts of isoparaffins having an average boiling point of 210° C. After these components were thoroughly mixed, 50.3 parts of water was added with high shear agitation to form an emulsion. To this emulsion was then added 8.0 parts of finely divided aluminum silicate having an average particle size diameter of 5 microns to produce a combination cleaner-polish emulsion within the scope of the present invention. One sample of this emulsion was retained for evaluation of emulsion stability and was stable after six months.

As a first control, a polish was made as in Example 1, but was not converted to the partial carboxylic acid salt. Instead, this copolymer was converted directly into an emulsion using the exact formulation described above. This control was stable at room temperature for less than two days before separating.

As a second control, the procedure of Example 1 was followed to produce a polish, but with the second copolymer replaced with a trimethylsilyl end-stopped polydimethyl siloxane fluid containing 300 dimethylsiloxy units per molecule. Following the procedure of Example 1, this material was converted to a partial acetic acid salt in which 37 percent of the amine groups had been converted to the acetic acid salt of the amine and then the salt was added to a polish formulation as a substitute for the salt of the present invention. This, too, resulted in a stable emulsion.

In order to compare the compositions of the present invention prepared in Example I with the second control, which differed only by omission of the second copolymer, two sections of a painted automobile panel were polished side by side with each composition. The composition of the present invention had comparable gloss to the second control and was comparable in rub-out to the second control. The composition of the present invention withstood 10 more detergent washing cycles than the second control, e.g., 45 cycles versus 35 cycles.

Each detergent washing cycle involved washing the panel in a 3 percent solution of a conventional automobile washing detergent at a temperature of 120° F. The panels were then washed with water and air dried.

EXAMPLE 2

Oil in water, liquid auto polish

Four different mixtures of components were prepared. Mixture A consisted of 1 part of a polydimethylsiloxane fluid containing 200 dimethylsiloxy units and chain-stopped with trimethylsiloxy groups, 2.5 parts oleic acid and 17.5 parts of isoparaffins having an average boiling point of about 210° C., sold under the trade name Isopar-M (Humble Oil Company). Mixture B consisted of 48.2 parts water, 2.0 parts morpholine, 0.1 part of a carboxyvinyl polymer containing approximately 1000 carboxyvinyl units, sold under the trade name Carbopol 934 (B. F. Goodrich), and 0.1 part triethanol amine. Mixture C consisted of 5 parts of the isoparaffins, 2 parts of the partial acetic acid salt of Example 1 and two parts of the second copolymer solution of Example 1. Mixture D consisted of 10 parts water, 10 parts of aluminum silicate having a particle size of approximately 7 microns, and 0.1 part of ammonium hydroxide. Mixture A was added to Mixture B with high speed agitation, Mixture C was then added with high shear agitation and then milled to a stable emulsion, and finally Mixture D was added slowly with good mixing. The resulting polish emulsion was stable in excess of six months and, when applied to an automobile test panel, exhibited easy rub-out, high gloss, and approximately 45 wash cycles of detergent resistance.

EXAMPLE 3

Oil in water paste auto polish

Four different mixtures of components were prepared. Mixture A consisted of 2 parts of a polydimethylsiloxane containing 260 dimethylsiloxy units and chain-stopped with trimethylsiloxy units, 2.5 parts oleic acid, and 12 parts of isoparaffins having an average boiling point of 210° C. Mixture B consisted of 61 parts of water, 2 parts of morpholine, 0.5 part of a carboxyvinyl polymer containing approximately 1000 carboxyvinyl units sold under the tradename Carbopol 934 (B. F. Goodrich), and 0.5 part of triethanolamine. Mixture C consisted of 5 parts of the isoparaffin, 1.5 part of the partial acetic acid salt of Example 1 and 1.5 part of the second copolymer of Example 1. Mixture D consisted of 4 parts of finely divided calcined diatomaceous earth, 1.5 parts of finely divided pyrogenic silica having a surface area of 325 square meters per gram, and 6 parts of a naturally occurring hydrous aluminum silicate clay. Mixture B was mixed until a homogeneous gel was formed. Then Mixture B was added to Mixture A and mixed until a white, viscous paste was formed. Mixture C was then added to the combination and mixed until homogeneous. Mixture D was then added with high shear agitation.

The paste auto polish formed was easy to apply, easy to rub out, and gave an exceptionally high gloss as compared with a similar polish composition containing only trimethylsilyl end-stopped polydimethylsiloxane fluid as the silicone component. When the second polysiloxane copolymer alone was replaced with a trimethylsilyl end-stopped polysiloxane fluid, normally used in polishes, the detergent resistance of the polish was greatly reduced.

EXAMPLE 4

Oil in water liquid automobile polish

The most important ingredient in the polish formulation described in this and the following examples is a new composition of matter, the preparation of which is herein described in detail.

The catalyst solution which was used in the SiH-acetylene addition reaction was a platinum coordinate catalyst solution formed by the reaction of chloroplatinic acid and octyl alcohol. The preparation of the catalyst solution is disclosed in Example 1 of U.S. Pat. 3,220,972 of Lamoreaux. Chemical analysis of this solution showed it to contain 3.5 atoms of chlorine per atom of platinum and 0.035 gram of platinum per gram of solution.

To a small one-necked flask containing a solution of 84 parts of 3,3-dimethylpropargyl alcohol and 53 parts of acrylonitrile was added one part of solid (powdered) sodium methylate. The mixture was stirred at 22°–25° C. by means of a magnetic stirrer. After a reaction time of 18 hours, gas chromatographic analysis indicated that the reaction was essentially complete. To the mixture was added 5 parts of trimethylchlorosilane to destroy the catalyst. After filtering the reaction mixture to remove the solids present (mostly NaCl), the clear, pale-orange filtrate was fractionally distilled under vacuum. There was obtained 115 parts (84% of theory) of the desired beta - (dimethylpropargyloxy)propionitrile, boiling at 57°–61° C./1.3 mm. Hg ($N_D^{25}$ 1.4328). Gas chromatography indicated a purity of greater than 99%.

Into a three-necked flask equipped with a magnetic stirrer, reflux condenser, thermometer, and addition funnel were placed 96 parts of beta-(dimethylpropargyloxy)propionitrile and one part of the platinum coordinate catalyst solution. To the addition funnel was charged 171 parts of trimethoxysilane. The acetylenic compound containing the catalyst was heated and stirred. When the temperature reached 100° C., 25 parts of trimethoxysilane was added dropwise and a mild exothermic reaction set in. When the temperature reached 125° C., a very rapid reaction caused vigorous refluxing. After cooling, the reaction mixture was heated at reflux until the reaction temperature rose to 125° C. and the remainder of the trimethoxysilane was added slowly while maintaining a reflux temperature of 125° C.–130° C. Continued heating resulted in a vigorous exotherm. Analysis following the exotherm indicated that all of the beta-(dimethylpropargyloxy)propionitrile had reacted. The reaction mixture was transferred to a distillation flask and the reaction mixture was fractionally distilled at a reduced pressure. There was obtained 81 parts of material boiling at 118°–122° C./1.1 mm. Hg. The infrared spectrum of this product was consistent with the expected structure, i.e., 3-(2-cyanoethoxy) - 3,3 - dimethyl-1-propenyltrimethoxysilane.

Into a pressure bottle was placed 81 parts of 3 - (2 - cyanoethoxy) - 3,3 - dimethyl - 1 - propenyltrimethoxysilane. To the bottle were added eight parts of Raney nickel catalyst and ½ part of sodium methoxide. The bottle was placed in a Parr hydrogenator and pressurized with hydrogen to 55 p.s.i. Shaking was started as the reaction mixture was heated to 110° C. As the pressure dropped to 30 p.s.i., additional hydrogen gas was introduced to maintain a pressure of 55 p.s.i. After a time interval of four hours, a total pressure drop of 52 p.s.i. had occurred and further drop in pressure did not occur. The excess pressure of the cooled system was released and a bluish liquid decanted away from the catalyst and fractionated. There was obtained 65 parts of a colorless material having a boiling point of 114° C. at 0.8 mm. Hg pressure. An infrared absorption scan failed to show the pressence of the nitrile absorption bands at 4.5 microns and did show the appearance of strong amine absorption bands at 2.1 microns and 6.25 microns, which was consistent with the expected structure, i.e., 3-(3-aminopropoxy) - 3,3 - dimethyl-1-propenyltrimethoxysilane.

A polysiloxane copolymer was formed by adding to a reaction vessel 97.4 parts of a silanol chain-stopped polydimethylsiloxane containing 800 dimethylsiloxy units, 2.6 parts of 3-(3-aminopropoxy)-3,3-dimethyl-1-propenyltri-methoxysilane and 33 grams of a mixture of isoparaffins having an average boiling points of 190° C. The silane reacted with the siloxane without the addition of heat. The solution of product formed had a viscosity of 1000 centistokes at 250° C.

A polish was formulated as in Example 2, except that the second polysiloxane copolymer solution of Example 2 was replaced with two parts of the polysiloxane copoylmer solution of the present example.

The polish was used on an automobile. The rub-out, gloss and detergent resistance were excellent.

EXAMPLE 5

Oil in water liquid automobile polish

To a one-necked flask was added 58 parts of allyl alcohol, 58 parts of methacrylonitrile and 63 parts of toluene. To the thimble of a Soxhlet extractor was added 10 parts of Rexyn 201, a polystyrene supported amine hydroxide ion-exchange resin of the formula:

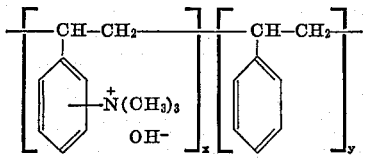

cross-linked with 15% divinyl benzene, where $x$ has an approximate value of over 1,000 and $y$ has an approximate value of over 2000. The Soxhlet extractor was fitted with a reflux condensor and attached to the flask. The mixture was stirred at reflux by means of a magnetic stirrer. During a period of 5 hours, the temperature slowly rose from 90° C. to 150° C. The toluene was then fractionally distilled from the reaction product at 350 mm. Hg. The pressure was dropped to 1.4 mm. Hg where the product distilled over at 53° C. There was obtained 100 parts of 3-(2-methyl-2-cyanoethoxy) propene-1 (98% of theory). In a 1000 ml. 3-necked flask equipped with magnetic stirrer, reflux condenser, thermometer, and addition funnel was placed 25.0 parts of 3-(2-methyl-2-cyanoethoxy)propene-1 and 0.2 part of the platinum coordinate catalyst solution described in Example 4. To the addition funnel was charged 24 parts of trimethoxysilane. By means of a heating mantle, the olefin was heated to 140° C. The heating mantle was then turned off and the trimethoxysilane was added dropwise. Stirring was provided throughout the addition by means of the magnetic stirrer. An exothermic reaction was noted which carried the reaction temperature to 172° C. However, after about half of the silane had been added, the reaction temperature began to fall. Heat was again supplied to maintain a temperature of 170°–175° C. during the remainder of the addition. Following the addition, the mixture was refluxed for an additional 2 hours (170° C.) then flash distilled at reduced pressure to recover the adduct. Thus was obtained 31.5 parts of material boiling at 135°–140° C./3–5 mm. Hg whose infrared spectrum was consistant with the structure of 3-(2-methyl-2-cyanoethoxy)propyltrimethoxysilane.

Into a 500 ml. pressure bottle was placed 10.8 parts of 3-(2-methyl-2-cyanoethoxy)propyltrimethoxysilane and 1.5 parts of Raney nickey catalyst. The bottle was then placed in a Parr hydrogenator and pressurized with hydrogen to 55 p.s.i. Shaking was started as the reaction mixture was heated to 100° C. As the pressure dropped to 30 p.s.i., additional hydrogen gas was introduced to maintain a pressure of 55 p.s.i. After a time interval of 8 hours, a total pressure drop of 77 p.s.i. was recorded and further pressure drop did not occur. The excess pressure of the cooled system was released and a dark reddish brown liquid was decanted from the catalyst. Distillation yielded 7.0 parts of 3-(2-methyl-3-aminopropoxy)propyltrimethoxysilane B.P. 104° C./0.7 mm. An IR scan of the product showed a complete absence of nitrile absorption and appearance of amine absorption at 2.9, 3.1 and 6.25 microns.

A polysiloxane copolymer was formed by adding to a reaction vessel 97.4 parts of a silanol chain-stopped polydimethylsiloxane containing 800 dimethylsiloxy units, 2.6 parts of 3-(2-methyl-3-aminopropoxy)propyltrimethoxysilane and 33 parts of a mixture of isoparaffins having an average boiling point of 190° C. The silane reacted with the siloxane without the addition of heat. The solution of product formed had a viscosity of 1200 centistokes at 25° C.

A polish was formulated as in Example 2, except that the second copolymer solution of Example 2 was replaced with two parts of the polysiloxane copolymer solution of the present example.

The polish was used on an automobile. The rub-out and gloss were equivalent to the polish described in Example 2. There was, however, a significant improvement in detergent resistance and emulsion stability.

EXAMPLE 6

Oil in water liquid automobile polish

To a reaction vessel was added 60 parts of a silanol chain-stopped polydimethylsiloxane within the scope of Formula 1 in which $n$ was equal to about 5, 15 parts of 3-(2-methyl-3-aminopropoxy)propyltrimethoxysilane and 25 parts of gamma-aminopropyltrimethoxysilane. This reaction mixture was thoroughly mixed and then 0.7 part water was added with stirring. This resulted in an organopolysiloxane copolymer having a viscosity of about 150 centistokes containing about 4.5 percent by weight methoxy groups and in which about 79 mole percent of the siloxane units were derived from the silanol chain-stopped polydimethylsiloxane, about 6 mole percent of the siloxane units were derived from gamma-aminopropyltrimethoxysilane, and about 15 mole percent of the siloxane units were derived from 3-(2-methyl-3-aminopropoxy)propyltrimethoxysilane.

Seven parts of the copolymer was converted to the partial aliphatic carboxylic acid salt by reaction with 0.35 part acetic acid to produce a product in which 37 mole percent of the amine groups were converted to the amine salt of acetic acid.

A second polysiloxane copolymer was formed by adding to a reaction vessel 97.4 parts of a silanol chain-stopped polydimethylsiloxane containing 800 dimethylsiloxy units, 2.6 parts of 3-(3-aminopropoxy)-3,3-dimethyl-1-propenyltrimethoxysilane and 33 parts of a mixture of isoparaffins having an average boiling point of 190° C. The silane reacted with the siloxane without the addition of heat. The solution of product formed had a viscosity of about 1000 centistokes at 25° C. and the solution was slightly hazy.

Four different mixtures of components were prepared. Mixture A consisted of 1 part of a polydimethylsiloxane fluid containing 200 dimethylsiloxy units and chain-stopped with trimethylsiloxy groups, 2.5 parts oleic acid and 17.5 parts of a mixture of isoparaffins having an average boiling point about 210° C., sold under the tradename Isopar-M (Humble Oil Company). Mixture B consisted of 48.2 parts water, 2.0 parts morpholine, 0.1 part of a carboxyvinyl polymer, containing approximately 1000 carboxyvinyl units, sold under the tradename Carbopol 934 (B. F. Goodrich), and 0.1 part triethanolamine. Mixture C consisted of 5 parts of the isoparaffins, 2 parts of the partial acetic acid salt and two parts of the second copolymer solution. Mixture D consisted of 10 parts water, 10 parts of aluminum silicate having a particle size of approximately 7 microns, and 0.1 part of ammonium hydroxide. Mixture A was added to Mixture B with high speed agitation, Mixture C was then added with high shear agitation and then milled to a stable emulsion and finally Mixture D was added slowly with good mixing. The resulting polish emulsion was applied to an automobile test panel. The polish had excellent gloss and rub-out. The polish survived over 80 detergent wash cycles.

While the foregoing examples have illustrated many of the embodiments of our invention, it should be understood that our invention relates broadly to the defined combination of organopolysiloxane copolymers. These compositions are especially useful in the formulation of polish emulsions of good stability, of good spreadability, of high gloss, and of high detergent resistance. These polish compositions are useful in the polishing of all types of enameled and lacquered surfaces both pigmented and unpigmented and are not limited to surfaces of automobiles and to furniture. The formulas used to describe the silicone fluids used and the polymers produced are average formulas according to the general practice of describing such materials.

The specific examples of polish composition set forth above are illustrative of the invention and illustrative of the combinations of ingredients which may be used. They merely serve as a guide to those engaged in the polish formulation trade. The composition and combination of ingredients may be varied within wide latittudes limited only by what is already known in the art without any serious problems arising.

What we claim as new and desire to secure by Letters Patent of the United States is:

1. A composition of organopolysiloxane copolymers comprising:
    (A) The partial hydrolysis and condensation product of
    (1) a liquid silanol chain-stopped polydiorganosiloxane having the formula:

(1) 

(2) an aminoalkylsilane having the formula:

(2) $H_2N(CH_2)_aSi(OR')_3$ and (3) an aminoalkoxyalkylsilane or an aminoalkoxyalkenylsilane having the formula:

(3) 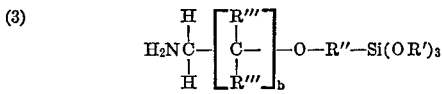

in combination with:

(B) The partial hydrolysis and condensation product of (4) a fluid, silanol chain-stopped polydiorganosiloxane having the formula:

(4) 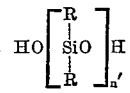

and (5) an aminoalkoxyalkylsilane or an aminoalkoxyalkenylsilane of the formula:

(5) 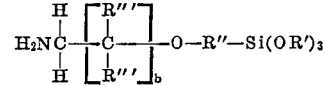

where R represents monovalent hydrocarbon radicals free of aliphatic unsaturation, at least 90% of which are methyl radicals, R' is an alkyl radical having up to 4 carbon atoms, R'' is a divalent alkylene radical containing from 2 to 6 carbon atoms, or a divalent alkenyl radical containing from 3 to 8 carbon atoms and an olefinic bond on the carbon atom adjacent to the silicon atom, R''' is a radical selected from the class consisting of hydrogen, lower alkyl radicals having 1 to 8 carbon atoms and 5 to 7 carbon cycloalkyl radicals, $n$ has a value of from about 2 to 20, inclusive, $n'$ has a value of from about 300 to 1000, inclusive, $a$ is an integer equal to from 3 to 6, inclusive, and $b$ is an integer equal to from 2 to 5, inclusive, said copolymer defined in paragraph A having a viscosity of from about 5 to 1,000 centistokes at 25° C. and containing from about 1 to 15 percent by weight —OR' radicals based on the weight of said copolymer, the proportions of said polydiorganosiloxane, said aminoalkylsilane, and said aminoalkoxyalkylsilane or said aminoalkoxyalkenylsilane, as defined by Formula 3, being selected to provide a total of from about 0.04 to 1.0 siloxane units derived from said aminoalkylsilane and said aminoalkoxyalkylsilane or said aminoalkoxyalkenylsilane per siloxane unit derived from said polydiorganosiloxane and from about 0.25 to 9 siloxane units derived from said aminoalkylsilane per siloxane unit derived from said aminoalkoxyalkylsilane, the proportions of said polydiorganosiloxane and said aminoalkoxyalkylsilane or said aminoalkoxyalkenylsilane, as defined by Formula 5, being selected to provide a total of from about 0.002 to 0.013 siloxane units derived from said aminoalkoxyalkylsilane or said aminoalkoxyalkenylsilane per siloxane unit derived from said polydiorganosiloxane, said combination containing from 5 to 95% by weight based upon the total weight of the copolymer defined in paragraph B.

2. A composition of claim 1 in which R is methyl.

3. A composition of claim 1 in which said aminoalkylsilane is gamma-aminopropyltrimethoxysilane.

4. A composition of claim 1 in which said aminoalkoxyalkylsilane of paragraph A is 3-(2-methyl-3-aminopropoxy)propyltrimethoxysilane.

5. A composition of claim 1 in which said aminoalkylsilane is gamma-aminopropyltrimethoxysilane, and the aminoalkoxyalkylsilane of paragraph A is 3-(2-methyl-3-aminopropoxy)propyltrimethoxysilane.

6. A composition of claim 5 in which R is methyl.

7. A partial aliphatic carboxylic acid salt of a composition of claim 1 in which from 10 to 50 percent of the amine groups of the aminoalkyl radicals of said aminoalkylsilane and said aminoalkoxyalkylsilane of paragraph A are converted to amine salts of aliphatic carboxylic acid.

8. A partial aliphatic carboxylic acid salt of claim 7 in which said carboxylic acid is acetic acid.

9. An organopolysiloxane copolymer of claim 7 in which from 10 to 50 percent of the amine groups of said gamma-aminopropyltrimethoxysilane and said 3-(2-methyl-3-aminopropoxy)propyltrimethoxysilane of paragraph A are converted to amine salts of aliphatic carboxylic acid.

10. A partial aliphatic carboxylic acid salt of the organopolysiloxane copolymer within the scope of claim 9 in which said aliphatic carboxylic acid is acetic acid.

11. A composition within the scope of claim 1 in which said aminoalkoxyalkenylsilane of Formula 5 is within the scope of the formula:

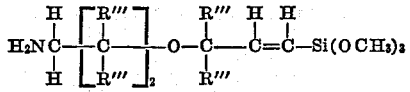

12. A composition within the scope of claim 11 in which R''' is selected from the class consisting of hydrogen and methyl radicals.

13. A composition within the scope of claim 11 wherein the aminoalkoxyalkenylsilane has the formula:

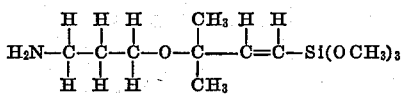

14. A composition of claim 1 in which R is methyl, the aminoalkylsilane is gamma-aminopropyltrimethoxysilane, the aminoalkoxysilane of Formula 3 is 3-(2-methyl-3-aminopropoxy)propyltrimethoxysilane, and the aminoalkoxyalkenylsilane of Formula 5 is 3-(3-aminopropoxy)-3,3-dimethyl-1-propenyltrimethoxysilane.

15. A polish emulsion of improved rub-out, improved gloss, and improved detergent resistance comprising water, a composition of claim 7, a hydrocarbon solvent and an emulsifying agent.

16. A polish emulsion of improved rub-out, improved gloss, and improved detergent resistance comprising water, a composition of claim 8, a hydrocarbon solvent, and an emulsifying agent.

17. A polish emulsion of improved rub-out, improved gloss, and improved detergent resistance comprising water, a composition of claim 9, a hydrocarbon solvent, and an emulsifying agent.

18. A polish emulsion of improved rub-out, improved gloss, and improved detergent resistance comprising water, a composition of claim 10, a hydrocarbon solvent, and an emulsifying agent.

References Cited

UNITED STATES PATENTS

| | | | |
|---|---|---|---|
| 2,755,194 | 7/1956 | Volkmann et al. | 106—11 |
| 3,044,982 | 7/1962 | Jex et al. | 260—46.5 |
| 3,045,036 | 7/1962 | Jex et al. | 260—46.5 |
| 3,341,338 | 9/1967 | Pater | 106—287 |
| 3,355,424 | 11/1967 | Brown | 260—46.5 |
| 3,392,143 | 7/1968 | Holub | 260—46.5 |
| 3,392,144 | 7/1968 | Holub | 260—46.5 |

JULIUS FROME, Primary Examiner

A. H. KOECKERT, Assistant Examiner

U.S. Cl. X.R.

106—3, 11, 387; 260—46.5, 448.2, 448.8, 825